H. D. RUMSEY.
CHURN.
No. 68,655. Patented Sept. 10, 1867.
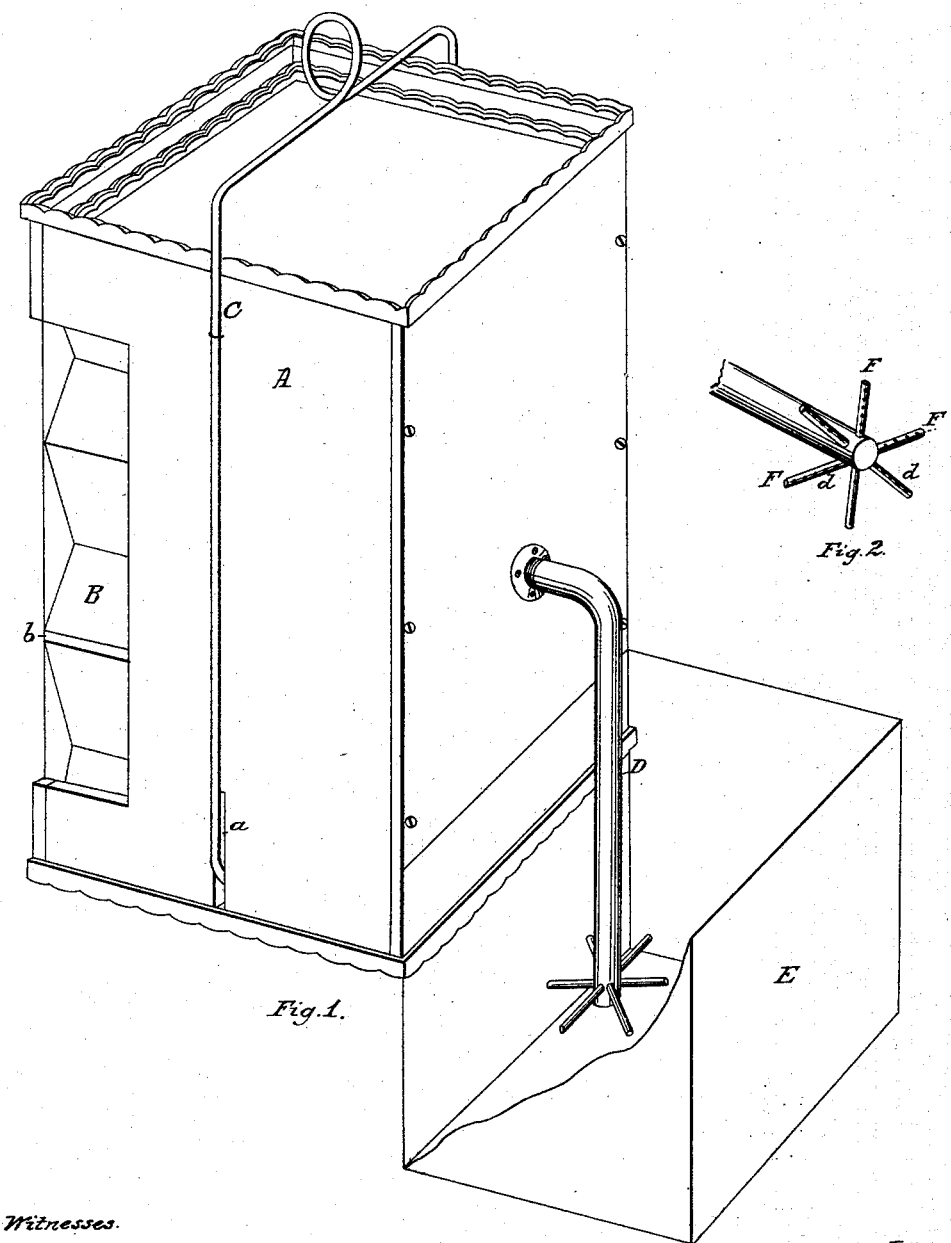

United States Patent Office.

HENRY D. RUMSEY, OF HOMER, NEW YORK.

Letters Patent No. 68,655, dated September 10, 1867.

IMPROVEMENT IN CHURNS.

*The Schedule referred to in these Letters Patent and making part of the same.*

TO ALL WHOM IT MAY CONCERN:

Be it known that I, HENRY D. RUMSEY, of Homer, in the county of Cortland, in the State of New York, have invented a new and improved Air-Churn; and I do hereby declare that the following is a full and exact description thereof, reference being had to the accompanying drawings, and to the letters of reference marked thereon. In the drawings—

Figure 1 is a perspective view of my invention, and
Figure 2 a view of the pipe and arms.

This invention consists of a bellows, in combination with a churn, for the purpose of making butter from cream in the latter through the injection thereinto of air from the former, as will be hereinafter fully described.

To enable those skilled in the art to make and use my invention, I will now proceed to describe its construction and operation.

A represents a trunk or case, made of wood or other suitable material, of any convenient form, and open at the top and bottom. B represents a bellows of ordinary construction, the upper and lower sides of which are of such size as to allow them to receive vertical reciprocating motion in the trunk A. The bellows is rigidly attached to the trunk at the point $b$, which is at the apex of one of the folds. This rigid attachment is made in order to furnish a point of resistance to the action of the air-expelling mechanism, that that mechanism may the more effectually discharge its functions. C represents a bail, the ends of which are attached to the lower side of the bellows at opposite points. A slot, $a$, is made in two of the opposite sides of the trunk A, extending upward from the bottoms of said sides far enough to admit of sufficient play of the bail C to operate the bellows. D represents a pipe, communicating at one end with the interior of the bellows B, and at the other with the interior of the churn E, through the series of minute orifices $d$, in the arms F, which project radially from the lower end of the pipe D. The churn E may be of any ordinary construction.

The operation of this device is easily comprehended. The operator taking hold of the bail C by its handle $c$, works it up and down, and thus imparts a vertical reciprocating motion to the lower side of the bellows. The upward movement of the said lower side of the bellows compresses the air and causes it to seek an exit through the pipe D. Thence rushing through the holes $d$ in the radial arms F, the arrangement of which is such as to give the jets of air the widest possible distribution into the circumjacent cream, it thoroughly agitates the whole mass so as to cause the rupture of the minute fat globules present therein, and the incorporation or kneading of these ruptured fat globules into masses of butter. It will thus be seen that by the use of my invention the air is made to play a mechanical part, taking the place of all the internal machinery for agitating cream that has heretofore been in use in churns. Operating the bellows is a very easy matter, compared with operating either dasher or crank in a churn full of cream. The thorough and constant agitation which the cream necessarily receives from the numerous jets of air forced into it from the bellows, permeating through every part, renders the operation of churning, under ordinary circumstances, very short.

Having thus fully described my invention, what I claim as new, and desire to secure by Letters Patent, is—

The bellows B, in combination with the pipe D and arms F, the latter being provided with the orifices $d$, in the manner and for the purpose described.

HENRY D. RUMSEY.

Witnesses:
GEORGE H. BRISTOL,
LEWIS P. PHILLIPS.
LEWIS A. BURGESS.